F. PETELER
BANDS FOR BUNDLES OF GRAIN.

No. 192,789. Patented July 3, 1877.

Witnesses.

Inventor.
Francis Peteler
by
Van Santvoord & Hauff
his attorneys

UNITED STATES PATENT OFFICE.

FRANCIS PETELER, OF MINNEAPOLIS, MINNESOTA.

IMPROVEMENT IN BANDS FOR BUNDLES OF GRAIN.

Specification forming part of Letters Patent No. 192,789, dated July 3, 1877; application filed December 26, 1876.

*To all whom it may concern:*

Be it known that I, FRANCIS PETELER, of Minneapolis, in the county of Hennepin and State of Minnesota, have invented certain new and useful Improvements in Bands for Bundles of Grain, &c., of which the following is a specification:

This invention relates to certain improvements in bands for bundles of grain and other material of a similar nature; and it consists of a piece of twine or cord and a block of wood provided near one end with an opening for the reception of one end of said twine or cord, and with a series of tapering notches on the opposite end of the block, one of said tapering notches serving to receive the free end of the twine or cord, and the other for locking or confining it after its passage around the bundle of grain, straw, or other package, to which it may be applied.

The peculiarity of this invention lies in the fact that in the block which serves as the medium for connecting the ends of the binding twine or cord after its passage around a bundle of grain, straw, or other material, the series of tapering notches which receive the free end of the binding twine or cord are all at one end of the block, while the opening which receives and connects the twine or cord with the block is near the opposite end, so that great strength can be exerted upon the twine or cord after its passage around the bundle to be bound and its insertion into one of the notches, as the line of draft will virtually be in the direction of the length of the block, whereby all tendency to tipping of the block will be avoided, which result could not be secured if the notches were on opposite sides of the block or on opposite sides of the opening to which the binding twine or cord is attached.

Figure 1:
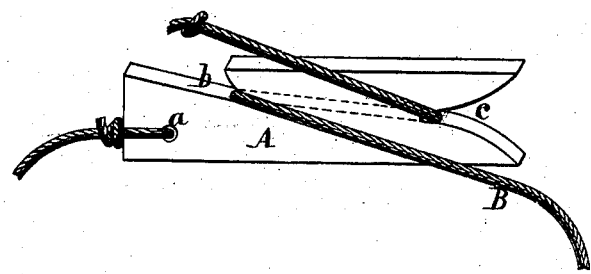
Figure 2:
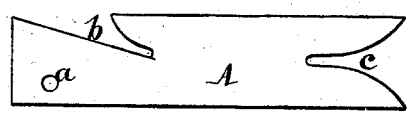

In the drawings, Figure 1 represents a perspective view of my band. Fig. 2 is a plan of the locking-block detached.

In the drawings, the letter A designates a tie-block, which is made of suitable material, such as metal or wood, preferably of wood, and of a form as shown in the drawings. The said tie-block is provided with an opening or hole, *a*, near one end, and with a series of incisions or tapering notches, *b c*, made flaring toward their outer edges, and terminating in a narrow channel, the width of which should be somewhat less than the diameter of the binding twine or cord which forms the band.

One end of the binding twine or cord is secured in the opening or hole *a*, while its other or free end should be tied in a knot so as to prevent it from slipping out of the opening or hole, and it is intended that the said free end of the binding twine or cord is to operate in conjunction with the tapering incisions or notches by inserting the same in one of the incisions or notches after its passage around a bundle of grain or straw, the side of which serves as a fulcrum or rest for the twine or cord when pulling upon it, for the purpose of tightening it around said bundle; and, as the draft is virtually in line with the tie-block and the twine or cord attached thereto, there is no tendency of the said block to tip—an objectionable feature present in those now in use, where the opening in the block for the twine or cord is between the notches for receiving and locking the free end. The cord or twine is, by preference, saturated with coal-tar to increase its durability.

In using the band for binding a bundle of grain or other material, the tie-block A is grasped with the left hand and held down close upon the bundle, the cord B is carried round the bundle with the hand, and, after having been drawn up tight, it is passed first into the incision or hole *b*, when considerable pressure can be applied for compressing the band, and, when sufficiently compressed, the free end is then passed into the incision or notch *c* and locked into position, as shown in Fig. 1, and the operation of tying the bundle is completed. The cord, being wedged into the narrow channels of the incisions or notches *b c*, is effectually prevented from slipping back, and there is no danger that the bundle may become loose in being handled.

The band, thus constructed, can be used with great advantage for bundles of grain, straw, corn-shucks, fodder, and all materials of a similar nature, and they are very economical in labor and in the cost. When thrashing, the band can be opened and the gavel served as rapidly as necessary. The band-opener will not require a knife or shears in his hand; he can work rapidly with both hands. If the binding is done with ordinary care there will be no loose bundles or scatterings in the stack as is usually with bands of wire, straw, willow, or other materials. The block on the band is easily seen. The pitcher can place nearly all bundles on the machine-table with the block-up. The original cost of the band is very small, and, if it is considered that the same can be used for several years, the great advantage of my band as regards economy will be apparent.

What I claim, and desire to secure by Letters Patent, is—

A band for bundles of grain and other materials of a like nature, composed of a piece of twine and a block of wood, provided with a hole near one end for the reception of one end of the twine, and with two tapering notches on the opposite end of the block, one for receiving the twine and the other for locking it after its passage around the bundle, substantially as herein shown and described.

In testimony that I claim the foregoing I have hereunto set my hand and seal this 12th day of December, 1876.

FRANCIS PETELER. [L. S.]

Witnesses:
H. C. MORRISON,
H. L. GORDON.